March 6, 1928.
H. M. NACEY
1,661,442
ALARM VALVE FOR AUTOMATIC SPRINKLING SYSTEMS
Filed Oct. 10, 1921
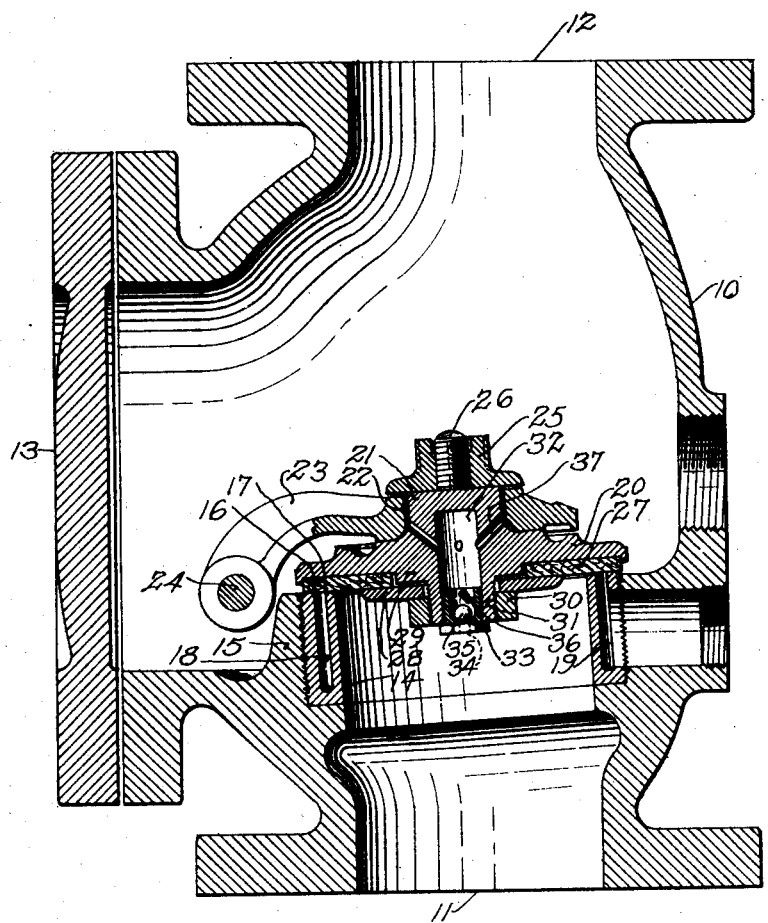
INVENTOR:
Harry M. Nacey Patented Mar. 6, 1928.

1,661,442

UNITED STATES PATENT OFFICE.

HARRY M. NACEY, OF CHICAGO, ILLINOIS.

ALARM VALVE FOR AUTOMATIC SPRINKLING SYSTEMS.

Application filed October 10, 1921. Serial No. 506,578.

This invention relates to improvements in inlet and alarm valves for automatic sprinkler systems, in which heretofore an inlet disc valve has been directly mounted at one side upon a pivot secured to the valve casing, and upon which the valve swings towards and from a main and auxiliary seat for the alarm port of such system, from which inlet disc valve depends a weight, provided with an inwardly converging passage in open communication with a passage through the disc valve, but opposed by a ball valve, which ball valve, when there is a slight excess of pressure, will be unseated sufficiently to allow enough water to pass through the disc valve to equalize the pressure without lifting the latter valve, and thus permit a flow of water to the customary alarm operated when the disc valve is lifted, by bringing the system into active operation.

Such a structure, however, is subject to a number of objections, among which may be mentioned that, being directly mounted upon a pivot, the position of the disc valve cannot be varied sufficiently to secure its accurate seating, and, if at all, much less to a tightly closed position, weighted, as it is, for the reason that the pressure of the incoming water tends to maintain, unseated, that portion of the valve opposite its pivotal support; and that the ball valve is frequently rendered inoperative by the packing of sand and other foreign substances in the converging passage thereto.

The object of this invention is to provide the inlet valve for an automatic sprinkling system with means by which said valve is automatically adjusted to accurately and firmly seat itself.

In other words, to provide a means by which the valve is so suspended that it will be automatically accurately directed to a firmly seated position.

A further object of my invention is to provide the inlet valve with an enlarged chamber intermediate a relatively small port, adapted to receive and discharge therefrom water admitted thereto from said port.

Another and important feature of my invention is to have the inlet valve inclined with reference to a horizontal plane. That is to say, relative to the plane of the ends of the valve casing whereby it is made possible and practicable for the valve to successfully operate in both a vertical and horizontal position.

To illustrate my invention, I annex hereto a sheet of drawings in which the single figure is a central vertical section through the valve.

In carrying out my invention, I employ a valve casing 10, which may be of any desired construction having the inlet port 11, the outlet port 12, and a cap 13 to give access to the interior thereof. To form the main valve seat, and also the auxiliary seat for the alarm port, I preferably employ the ring 14 shown as threaded into the internal boss 15, this ring having the two separate seats a main valve seat 16 and an auxiliary valve seat 17 formed by placing in the ring the deep annular channel 18 which communicates with the outlet 19 which leads to the customary mechanical or electrical alarm that is employed in these devices, to be actuated by the flow of water through the port 19 to indicate when the system has been opened at any point by the automatic action of the sprinkler. The disc valve 20 is preferably mounted to seat itself accurately by reason of having the annular boss 21 at the top extending into the correspondingly shaped but loosely fitting aperture 22 formed in the end of the valve lever 23 which is fulcrumed by the pin 24 suitably secured in the walls of the valve casing. A nut 25 overhanging the aperture 22 and secured on the threaded extension 26 of the boss 21 serves to hold the valve disc in place while permitting it to vary its position relative to the lever as much as may be necessary to insure a firm seat for the annular leather or other yielding piece 27 which engages the seats 16 and 17. The annular member 27 is held in place by the washer 28 cooperating with the shoulder 29 formed on the bottom of the disc valve 20 and held in place by the nut 30 screwed onto the internally and externally threaded boss 31 which is opposed to the boss 21.

Inside of and preferably at the center of the disc valve 20, I form the relief valve chamber 32, which is closed by the valve cup 33 threaded into the bottom thereof, this valve cup having the small port 34 in the bottom thereof, this port being for a valve of the ordinary size, about a quarter of an inch in diameter. In the enlarged portion above the port I place the ball check valve 35, which is held in place, if the valve should be placed on its side in use, by the detent wire 36 passed through and secured in the top of the valve cup 33. At the base of the boss 21 I drill through into the chamber 32 a plurality, preferably four, of small passages 37, the combined area of which does not exceed the area of the port 34.

It is now to be observed that the seat for the disk valve is inclined downwardly toward the pivot 24 of the valve lever and relatively to the vertical axis of the valve casing, for thereby providing a means by which the valve may be operated when the casing is located in a horizontal position, or when in the vertical position shown in the drawing, and which would not be possible if the valve were rigidly secured to the pivoted valve lever 23, as in the prior art before described, for the reason that the weight for the valve would normally tend to maintain the valve off its seat when the casing for such valve is located in a horizontal position.

In other words, with the valvet loosely suspended in the valve lever, the pivot of which is located substantially inwardly of the valve seat, it will be seen that the weight of the valve combined with that of the valve lever, and the tendency of the latter to swing inwardly towards the valve seat will operate to automatically seat the valve, and this especially in view of the fact that such seat inclines downwardly towards the fulcrum of the valve lever.

The operation of my improved device will be apparent. During normal conditions, the pressure of water above and below the disc valve 20 is the same, so that it has no tendency to raise. When the sprinkler system is opened anywhere, a considerable volume of water rushes up through the valve and necessarily opens the same and the channel 18 is uncovered so that water can flow out through the port 19 to actuate the alarm. In case of slight variations in pressure, due to the pulsations of pumps or for other reasons, the pressure of which would tend to unseat the main valve, the check valve 35 is lifted, it offering very little resistance, and a small quantity of water passes through the passages 37 to the upper side of the valve, thus relieving the pressure without unseating the main valve. If the valve were always employed in a system where the same pressure was intended to be maintained on both sides of the valve 20, the check valve 35 might be dispensed with, but as it will sometimes be installed where pressure is intended to be higher on the upper side of the valve, I employ a check valve to permit its use in such installations.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

Having described my invention, what I claim and desire to secure by Letters Patent is:

1. An alarm valve adaptable for use either in a vertical or horizontal position, comprising in combination a pivoted lever, a valve suspended loosely enough therein to form a water discharge passage through the lever, said valve having therein a water chamber and outlet passages therefor in open communication with said discharge passage, said chamber and passages establishing communication between the two sides of said first mentioned valve, and a check valve for controlling the supply of water to said chamber.

2. An alarm valve adaptable for use either in a vertical or horizontal position, comprising in combination a pivoted lever, a valve suspended loosely enough therein to form a water discharge passage through the lever, said valve having therein a water chamber and a series of oblique outlet passages therefor in communication with said discharge passage whereby communication is established between the two sides of said valve, and a check valve for controlling the supply of water to said chamber.

3. An alarm valve adaptable for use either in a vertical or horizontal position, comprising in combination a pivoted lever, a valve suspended loosely enough therein to form a water discharge passage through the lever and around the valve suspended therein, said valve having therein a water chamber provided at its inner end with a check valve and adjacent its outer end with outlet passages extending outwardly and upwardly from said chamber and opening into said discharge passage to establish communication between the two sides of said suspended valve, whereby pressure on said sides may be equalized.

4. An alarm valve, adaptable for use in either a vertical or horizontal position, comprising a casing having an inlet, an outlet and an alarm port therein, an inclined valve seat in said casing, a pivoted lever overhanging said seat, an inlet valve loosely mounted in said lever and engageable with said seat, said valve having a cylindrical chamber therein and a plurality of oblique passages leading upwardly therefrom to the exterior of said valve, a valve cup having a relatively small port therein removably mounted in the bottom of said valve and communicating with said chamber, and a ball check valve in said valve cup, said chamber and passages establishing communication between the sides of said loosely mounted valve, whereby the pressure on said sides may be equalized.

5. An alarm valve for automatic sprinkler systems comprising in combination, a casing having an inlet, an outlet and an alarm port therein, a valve seat removably mounted in said casing and having a channel therein communicating with said alarm port, a pivoted lever having an aperture therein overhanging said seat, a valve member having a cylindrical chamber therein loosely mounted in said aperture, said valve member having passages therein to establish communication between said chamber and said aperture, an integral internally and externally threaded member depending from said valve member, a nut threaded on said depending member to retain a washer and a packing ring on said valve member, a valve cup threaded in said depending member and having an aperture in the bottom thereof establish communication with said chamber from the opposite side of said valve member, a ball check valve in said cup, and resilient means to retain said check valve in said cup to normally cut off said communication.

In witness whereof I have hereunto set my hand this 8th day of October, 1921.

HARRY M. NACEY.